US008531154B2

(12) United States Patent
Arai (10) Patent No.: US 8,531,154 B2
(45) Date of Patent: Sep. 10, 2013

(54) BATTERY SYSTEM AND BATTERY SYSTEM-EQUIPPED VEHICLE

(75) Inventor: Takuichi Arai, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 13/058,368

(22) PCT Filed: Jun. 18, 2009

(86) PCT No.: PCT/JP2009/061086
§ 371 (c)(1),
(2), (4) Date: Feb. 10, 2011

(87) PCT Pub. No.: WO2010/146681
PCT Pub. Date: Dec. 23, 2010

(65) Prior Publication Data
US 2011/0156644 A1    Jun. 30, 2011

(51) Int. Cl.
*H02J 7/00*   (2006.01)
(52) U.S. Cl.
USPC ................ 320/109; 320/134; 320/136
(58) Field of Classification Search
USPC .............................. 320/109, 134, 136
See application file for complete search history.

(56) References Cited

U.S. PATENT DOCUMENTS

| 5,539,318 A * | 7/1996 | Sasaki ........................ 324/428 |
| 5,631,533 A | 5/1997 | Imaseki | |
| 5,819,187 A | 10/1998 | Sato et al. | |
| 6,659,213 B2 | 12/2003 | Kubo et al. | |
| 6,949,897 B2 * | 9/2005 | Wakashiro et al. .......... 318/139 |
| 7,839,116 B2 * | 11/2010 | Esaka et al. ................ 320/103 |
| 2003/0025479 A1 | 2/2003 | Kikuchi | |

FOREIGN PATENT DOCUMENTS

| DE | 10302860 A1 | 8/2004 |
| DE | 102008008238 A1 | 8/2008 |
| JP | 8-331704 | 12/1996 |
| JP | 2000-30753 | 1/2000 |
| JP | 3161215 | 2/2001 |
| JP | 2001-157369 | 6/2001 |
| JP | 2001-268708 | 9/2001 |
| JP | 2003-47108 | 2/2003 |

(Continued)

OTHER PUBLICATIONS

Office Action issued Apr. 16, 2012, in German Patent Application No. 11 2009 004 957.5 with English translation (6 pages).

(Continued)

*Primary Examiner* — M'Baye Diao
(74) *Attorney, Agent, or Firm* — Finnegan, Henderson, Farabow, Garrett & Dunner, LLP (57) ABSTRACT

A battery system 100 includes an upper-limit electrical quantity setting means (an ECU 120) for setting an upper limit of an electrical quantity (an upper-limit electrical quantity Da) obtainable from a battery pack 110 to a lower value than in a full charge state. This upper-limit electrical quantity setting means 120 sets the upper-limit electrical quantity Da to a value having a difference from the electrical quantity (a full-charge electrical quantity Dmax) obtainable from the full charge state so that the difference is smaller as the deterioration of the battery pack 110 progresses. Further, the battery system 100 includes a charging means (the ECU 120) for charging the battery pack 110 under the condition that the upper-limit electrical quantity Da is an upper limit.

10 Claims, 6 Drawing Sheets

(56) References Cited

FOREIGN PATENT DOCUMENTS

| | | |
|---|---|---|
| JP | 3421398 | 4/2003 |
| JP | 2004-186087 | 7/2004 |
| JP | 2008-201262 | 9/2008 |
| JP | 2008-308122 | 12/2008 |
| JP | 2009-27801 | 2/2009 |

OTHER PUBLICATIONS

International Search Report in International Application No. PCT/JP2009/061086; Mailing Date: Sep. 8, 2009.
Translation of the International Preliminary Report on Patentability for PCT/JP2009/061086 dated Dec. 22, 2011.

* cited by examiner

BATTERY SYSTEM AND BATTERY SYSTEM-EQUIPPED VEHICLE

CROSS-REFERENCE TO RELATED APPLICATIONS

This is a national phase application filed under 35 U.S.C. 371 of PCT/JP2009/061086 on Jun. 18, 2009, which is incorporated herein by reference.

TECHNICAL FIELD

The present invention relates to a battery system including a secondary battery (hereinafter, also simply referred to as a battery) and supplying electric energy of this secondary battery to a power source, and a battery system-equipped vehicle mounting this battery system.

BACKGROUND ART

Heretofore, there are widely known a battery system supplying electric energy of a secondary battery to a power source and a battery equipped vehicle equipped with this battery system. The battery system-equipped vehicle may include for example an electric vehicle, a plug-in hybrid car, a hybrid car, a hybrid railway vehicle, etc. Patent Literatures 1 to 3 listed below disclose such battery systems and battery system-equipped vehicles.

An electric propulsion vehicle (a battery system-equipped vehicle) disclosed in Patent Literature 1 is arranged to set the magnitude of initial output of a secondary battery to a magnitude equal to or larger than an output value obtained by adding a decreased amount of output resulting from a memory effect of the subject secondary battery and an allowable decreased amount of output resulting from aged deterioration of the secondary battery to the output value of a motor. When the initial output of the secondary battery is set to a large value as above, even if the secondary battery deteriorates with time or even if the memory effect occurs in the secondary battery, the secondary battery can provide anytime output power as equal as or larger than the set output value of the motor within a performance warranty period. Thus, the motor can always output power at least at the set output value or more. This makes it possible to prevent deterioration in electric efficiency caused when a user excessively presses an accelerator pedal, and also avoid unnecessary replacement of secondary batteries.

An electric vehicle (a battery system-equipped vehicle) disclosed in Patent Literature 2 is arranged to previously set a plurality of charging modes (economy mode, normal mode, and long drive mode) different in maximum capacity ratio depending on charging current and charging time. From those charging modes, a user chooses one having a maximum capacity ratio corresponding to an intended travel distance of a vehicle. The vehicle performs charging to obtain a charging electrical quantity in the chosen charging mode. It is disclosed that such action can avoid the execution of excessive charging according to the charging mode, energy efficiency is not unnecessarily decreased, so that charging can be conducted according to the purpose of use.

A battery system disclosed in Patent Literature 3 includes a discharging control means for stopping discharging when the voltage of a secondary battery becomes lower than a predetermined reference value during discharging of the secondary battery; and a charging control means for stopping charging when the voltage of the secondary battery becomes higher than the predetermined reference value during charging of the secondary battery. This battery system also includes a history estimating means for estimating the history of the secondary battery based on its state. The discharging control means revises the voltage reference value at which discharging is to be stopped to a larger value according to a historical estimated value by the history estimating means. The charging control means revises the voltage reference value at which charging is to be stopped to a smaller value according to the historical estimated value by the history estimating means. It is disclosed that such control conducted to mitigate an increase in capacity degradation ratio of the secondary battery can extend the life of the secondary battery.

CITATION LIST

Patent Literature
Patent Literature 1: JP 8(1996)-331704A
Patent Literature 2: JP Patent No. 3421398
Patent Literature 3: JP Patent No. 3161215

SUMMARY OF INVENTION

Technical Problem

However, the electric propulsion vehicle of Patent Literature 1 charges up to a full charge state in every charging. This accelerates the deterioration of the secondary battery. Accordingly, it is necessary to further add this deterioration estimating amount to the battery in order to allow the vehicle to travel at a warranted travelable distance even when the deterioration of the battery advances. Thus, a battery capacity mounted in the vehicle is apt to increase. This causes large weight of the vehicle and cost increase.

In the electric vehicle in Patent Literature 2, the user chooses the charging mode. If the long drive mode continuously remains set, for example, full charging or nearly full charging is repeated, thus accelerating the deterioration of the secondary battery. Choosing the charging mode is also troublesome.

On the other hand, the battery system in Patent Literature 3 is arranged such that the charging control means stops charging when the voltage of the secondary battery exceeds the predetermined reference value during charging of the secondary battery. In addition, this charging control means revises the vehicle reference value at which charging is to be stopped to a smaller value according to the historical estimated value of the secondary battery. It is therefore possible to avoid full charging and prevent the progress of deterioration of the secondary battery. In this battery system, however, the voltage reference value at which charging is to be stopped is revised to gradually decrease according to the historical estimated value of the secondary battery. Thus, if this voltage reference value is too smaller, it may cause a situation in which a required electrical quantity cannot be obtained from the secondary battery even within the performance warranty period. Accordingly, the battery system-equipped vehicle mounting this battery system may not ensure the warranted travelable distance even within the performance warranty period.

As above, the conventional battery system and the battery system-equipped vehicle mounting this battery system could not restrain the progress of deterioration of the secondary battery. Alternatively, even though the progress of deterioration of the secondary battery could be restrained, the warranted electrical quantity could not be obtained from the battery system for a predetermined period such as a performance warranty period. The battery system-equipped vehicle also could not ensure the warranted travelable distance over the predetermined period such as the performance warranty period.

The present invention has been made in view of the circumstances to solve the above problems and has a purpose to provide a battery system capable of preventing the progress of deterioration of a secondary battery and hence reducing an initial battery capacity by just that much, and ensuring a sufficient magnitude of electrical quantity for charging and discharging for a long period. Furthermore, another purpose of the invention is to provide a battery system-equipped vehicle mounting this battery system and arranged to prevent the progress of deterioration of a secondary battery and hence reduce an initial battery capacity by just that much, and ensure a sufficient magnitude of electrical quantity for charging and discharging for a long period.

Solution to Problem

To achieve the above purpose, one aspect of the invention provides a battery system including a secondary battery and supplying electric energy of this secondary battery to a power source, the battery system comprising: an upper-limit electrical quantity setting means for setting an upper-limit electrical quantity which is an upper limit of an electrical quantity obtainable from the secondary battery to a lower quantity than in a full charge state, the upper-limit electrical quantity setting means being arranged to set the upper-limit electrical quantity to a value having a difference from a full-charge electrical quantity which is an electrical quantity obtainable from the secondary battery in a full charge state so that the difference is smaller as deterioration of the secondary battery progresses; and a charging means for charging the secondary battery under the condition that the upper-limit electrical quantity is un upper limit when the secondary battery is charged.

As described above, when the secondary battery is repeatedly charged up to a full charge state, the deterioration of the secondary battery progresses more quickly. In the above battery system, on the other hand, the upper-limit electrical quantity setting means sets the upper limit of the electrical quantity (the upper-limit electrical quantity) obtainable from the secondary battery to a smaller value than in the full charge state and the charging means charges the secondary battery under the condition that this upper-limit electrical quantity is an upper limit. Setting the upper limit of charging as above can restrain the progress of deterioration of the secondary battery. Since the capacity of the secondary battery needed in light of future deterioration can made smaller, the capacity of the secondary battery mounted in the battery system can be reduced.

In this battery system, furthermore, the upper-limit electrical quantity is set to a value whose difference from the electrical quantity (a full-charge electrical quantity) obtainable from the full charge state is smaller as the deterioration of the secondary battery progresses. Even if the deterioration of the secondary battery progresses, it is therefore possible to prevent the electrical quantity obtainable from the secondary battery when charged up to the upper-limit electrical quantity from decreasing to the progression of the deterioration of the secondary battery by slowly decreasing the electrical quantity as compared with the deterioration of the secondary battery, providing a constant electrical quantity irrespective of the deterioration of the secondary battery, or gradually increasing the electrical quantity as compared with the deterioration of the secondary battery. Consequently, the battery system can ensure a sufficient magnitude of electrical quantity allowed to be charged and discharged stably for a long period. When this battery system is mounted in for example a vehicle as mentioned later, a sufficient travelable distance after charging can be ensured for a long period.

Setting of the upper-limit electrical quantity by the upper-limit electrical quantity setting means can be conducted at least either when or before the secondary battery is charged. In other words, for example, the upper-limit electrical quantity can be set when the secondary battery is charged by the charging means. As an alternative, the upper-limit electrical quantity may be set in advance before the charging means conducts charging, for example, the upper-limit electrical quantity may be set at regular intervals.

Further, "setting the upper-limit electrical quantity" by the upper-limit electrical quantity setting means may include the case of directly setting a value of the "upper-limit electrical quantity" itself. It may also include the case of indirectly setting the "upper-limit electrical quantity" by setting an index corresponding to the "upper-limit electrical quantity" such as terminal voltage (upper limit terminal voltage) or SOC (upper limit SOC) of the secondary battery corresponding to the "upper-limit electrical quantity" at each time point of the progress of deterioration of the secondary battery. It is to be noted that SOC (State of Charge) represents a residual capacity of a battery, indicating a charge state of the battery.

Further, in the aforementioned battery system, preferably, the upper-limit electrical quantity setting means is arranged to fix the upper-limit electrical quantity to a constant value.

In this battery system, the upper-limit electrical quantity is fixed to a constant value. Specifically, even if the deterioration of the secondary battery progresses, the electrical quantity obtainable from this secondary battery when charged up to the upper-limit electrical quantity is made constant. Thus, the battery system can provide a constant magnitude of electrical quantity allowed to charged and discharged for a long period. In the case where this battery system is mounted in for example a vehicle as mentioned later, a constant travelable distance after charging can be achieved for a long period.

Further, in one of the aforementioned battery systems, preferably, further comprises an upper-limit electrical quantity disabling means for enabling charging of the secondary battery beyond the upper-limit electrical quantity by disabling the upper-limit electrical quantity as the upper limit.

This battery system further includes the aforementioned upper-limit electrical quantity disabling means. Accordingly, when this means is applied, the secondary battery can be charged beyond the upper-limit electrical quantity. Even in the case where the power consumption is estimated in advance to be larger, e.g., where this battery system is mounted in a vehicle and auxiliary devices such as a heater and an air conditioner are may be activated, the secondary battery can be charged beyond the upper-limit electrical quantity and hence a sufficient travelable distance can be ensured.

Further, in the aforementioned battery system, preferably, the secondary battery has a characteristic of causing a memory effect.

In this battery system, charging of the secondary battery beyond the upper-limit electrical quantity is enabled by the above upper-limit electrical quantity disabling means. For example, when the secondary battery is discharged to SOC 0% and recharged up to SOC 100%, the secondary battery can be refreshed. This can eliminate the memory effect even if occurs in the secondary battery.

Examples of a secondary battery having a characteristic of causing the memory effect are a nickel metal hydride battery, a nickel cadmium battery, some of lithium batteries, and others.

Further, another aspect of the invention provides a battery system-equipped vehicle mounting one of the above battery systems.

Since this battery system-equipped vehicle mounts the aforementioned battery system, it can prevent the progress of deterioration of the secondary battery and hence reduce the capacity of the mounted secondary battery by just that much.

Even if the deterioration of the secondary battery progresses, the aforementioned electric system can prevent the electrical quantity obtainable from this secondary battery when charged up to the upper-limit electrical quantity from decreasing to the progression of deterioration of the secondary battery. Accordingly, this battery system-equipped vehicle can ensure a sufficient travelable distance after charging for a long term.

Furthermore, in the case where the upper-limit electrical quantity is fixed to a constant value, as mentioned value, the battery system can provide a constant magnitude of the electrical quantity allowed to be charged and discharged for a long period and hence the battery system-equipped vehicle can provide a constant travelable distance after charging for a long period.

In the case where the aforementioned upper-limit electrical quantity disabling means is further provided, charging of the secondary battery beyond the upper-limit electrical quantity is enabled. Accordingly, even when it is estimated that the power consumption increases due to operation of an auxiliary device such as a heater and an air conditioner, a sufficient travelable distance after charging can be ensured.

Examples of the "battery system-equipped vehicle" are an electric vehicle, a plug-in hybrid car, a hybrid car, a hybrid railway vehicle, a forklift, an electric-driven wheel chair, an electrically assisted bicycle, an electric scooter, etc.

Preferably, the battery system-equipped vehicle is a plug-in vehicle capable of charging the secondary battery when the vehicle is connected to an external power source, and the upper-limit electrical quantity setting means sets the upper-limit electrical quantity according to a deterioration degree of the secondary battery at that time when plug-in charging through the external power source is to be performed.

Plug-in charging is considered to enable charging for a long period for example from night to morning in many cases. Accordingly, different from charging for a short time through a regenerative braking during traveling or running for example, charging up to the upper-limit electrical quantity can be performed in many cases. In this battery system-equipped vehicle, the upper-limit electrical quantity setting means sets the upper-limit electrical quantity according to the deterioration degree of the secondary battery at that time when the plug-in charging is conducted. Therefore, a more appropriate upper-limit electrical quantity can be set according to the deterioration degree of the secondary battery at that time, thereby performing appropriate plug-in charging.

Another aspect of the invention provides a battery system including a secondary battery and supplying electric energy of this secondary battery to a power source, the battery system comprising: an upper-limit SOC setting means for setting an upper-limit SOC smaller than SOC 100%, this setting means being arranged to set the upper-limit SOC to a larger value as the deterioration of the secondary battery progresses; and a charging means for charging the secondary battery under the condition that the upper-limit SOC is charged when the secondary battery is charged.

When the secondary battery is repeatedly charged up to a full charge state, as mentioned above, the deterioration of the secondary battery progresses more quickly. In the above battery system, on the other hand, the upper-limit SOC setting means sets an upper-limit SOC smaller than SOC 100% and the charging means charges the secondary battery under the condition that this upper-limit SOC is an upper limit. Setting the upper limit of charging in this way can restrain the progress of deterioration of the secondary battery. Since the capacity of the secondary battery needed in light of future deterioration can made smaller, the capacity of the secondary battery mounted in the battery system can be reduced.

In this battery system, furthermore, the upper-limit SOC is set to a larger value as the deterioration of the secondary battery progresses. Even if the deterioration of the secondary battery advances, it is possible to prevent the electrical quantity obtainable from the secondary battery when charged up to the upper-limit SOC from decreasing to the progression of the deterioration of the secondary battery by slowly decreasing the electrical quantity as compared with the deterioration of the secondary battery, providing a constant electrical quantity irrespective of the deterioration of the secondary battery, or gradually increasing the electrical quantity as compared with the deterioration of the secondary battery. Consequently, the battery system can ensure a sufficient magnitude of electrical quantity allowed to be charged and discharged stably for a long period. When this battery system is mounted in for example a vehicle as mentioned later, a sufficient travelable distance after charging can be ensured for a long period.

Setting of the upper-limit SOC by the upper-limit SOC setting means can be conducted at least either when or before the secondary battery is charged. In other words, for example, the upper-limit SOC may be set when the secondary battery is charged by the charging means. As an alternative, the upper-limit SOC may be set in advance before the charging means conducts charging, for example, the upper-limit SOC may be set at regular intervals.

As mentioned above, the SOC (State of Charge) represents a residual capacity of a battery, indicating a charge state of the battery. The SOC can be estimated by voltage detection, current integration, and others.

Further, in the aforementioned battery system, preferably, the upper-limit SOC setting means is arranged to set the upper-limit SOC to such a value as to provide a constant electrical quantity obtainable from the secondary battery irrespective of the progress of deterioration of the secondary battery when the secondary battery is discharged from the upper-limit SOC.

In this battery system, the upper-limit SOC is set in the above way. Specifically, even if the deterioration of the secondary battery advances, the electrical quantity obtainable from this secondary battery when charged up to the upper-limit SOC is made constant. Thus, the battery system can provide a constant magnitude of the electrical quantity allowed to be charged and discharged for a long period. In the case where this battery system is mounted in for example a vehicle as mentioned later, a sufficient travelable distance after charging can be ensured for a long period.

Further, in the aforementioned battery system, preferably, further comprises an upper-limit SOC disabling means for enabling charging of the secondary battery beyond the upper-limit SOC by disabling the upper-limit SOC as the upper limit.

This battery system further includes the aforementioned upper-limit SOC disabling means. Accordingly, when this means is applied, the secondary battery can be charged beyond the upper-limit SOC. Even in the case where the power consumption is estimated in advance to be larger, e.g., where this battery system is mounted in a vehicle and auxiliary devices such as a heater and an air conditioner may be activated, the secondary battery can be charged beyond the upper-limit SOC and hence a sufficient travelable distance can be ensured.

Further, in one of the aforementioned battery systems, preferably, the secondary battery has a characteristic of causing a memory effect.

In this battery system, charging of the secondary battery beyond the upper-limit SOC is enabled by the above upper-limit SOC disabling means. For example, when the secondary battery is discharged to SOC 0% and recharged up to SOC 100%, the secondary battery can be refreshed. This can eliminate the memory effect even if occurs in the secondary battery.

Another aspect of the invention provides a battery system-equipped vehicle mounting one of the above battery systems.

Since this battery system-equipped vehicle mounts the aforementioned battery system, it can prevent the progress of deterioration of the secondary battery and reduce the capacity of the mounted secondary battery by just that much.

Even if the deterioration of the secondary battery advances, the aforementioned electric system can prevent the electrical quantity obtainable from this secondary battery when charged up to the upper-limit SOC from decreasing to the progression of deterioration of the secondary battery. Accordingly, this battery system-equipped vehicle can ensure a sufficient travelable distance after charging for a long term.

In the case where the upper-limit SOC is set to such a value as to provide a constant electrical quantity obtainable from the secondary battery, the battery system can provide a constant magnitude of electrical quantity allowed to be charged and discharged for a long period. This battery system-equipped vehicle can achieve a constant travelable distance after charging for a long period.

Further, when the above upper-limit SOC disabling means is provided, charging of the secondary battery beyond the upper-limit SOC is enabled. Even in the case where the power consumption is estimated in advance to be larger, e.g., where this battery system is mounted in a vehicle and auxiliary devices such as a heater and an air conditioner may be activated, the secondary battery can be charged beyond the upper-limit SOC and hence a sufficient travelable distance can be ensured.

In the aforementioned battery system-equipped vehicle, further preferably, the battery system-equipped vehicle is a plug-in vehicle capable of charging the secondary battery when the vehicle is connected to an external power source, and the upper-limit SOC setting means sets the upper-limit SOC according to a deterioration degree of the secondary battery at that time when plug-in charging through the external power source is to be performed.

Plug-in charging is considered to enable charging for a long period for example from night to morning in many cases. Accordingly, different from charging for a short time through a regenerative braking during traveling or traveling for example, charging up to the upper-limit SOC can be performed in many cases. In this battery system-equipped vehicle, the upper-limit SOC setting means sets the upper-limit SOC according to the deterioration degree of the secondary battery at that time when the plug-in charging is conducted. Therefore, a more appropriate upper-limit SOC can be set according to the deterioration degree of the secondary battery at that time, thereby performing appropriate plug-in charging.

REFERENCE SIGNS LIST

100, 102, 103, 104, 105, 106 Battery system
110 Battery pack (Secondary battery)
120, 122, 123, 124, 125, 126 ECU
130 Inverter
140 AC-DC converter
150 Cable
160 Cable with plug
200, 202, 203, 204, 205, 206 Plug-in hybrid car (Battery system-equipped vehicle)
210 Vehicle body
220 Engine
230 Front motor
240 Rear motor
XV External power source

DESCRIPTION OF EMBODIMENTS (Embodiment 1)

Figure 1:
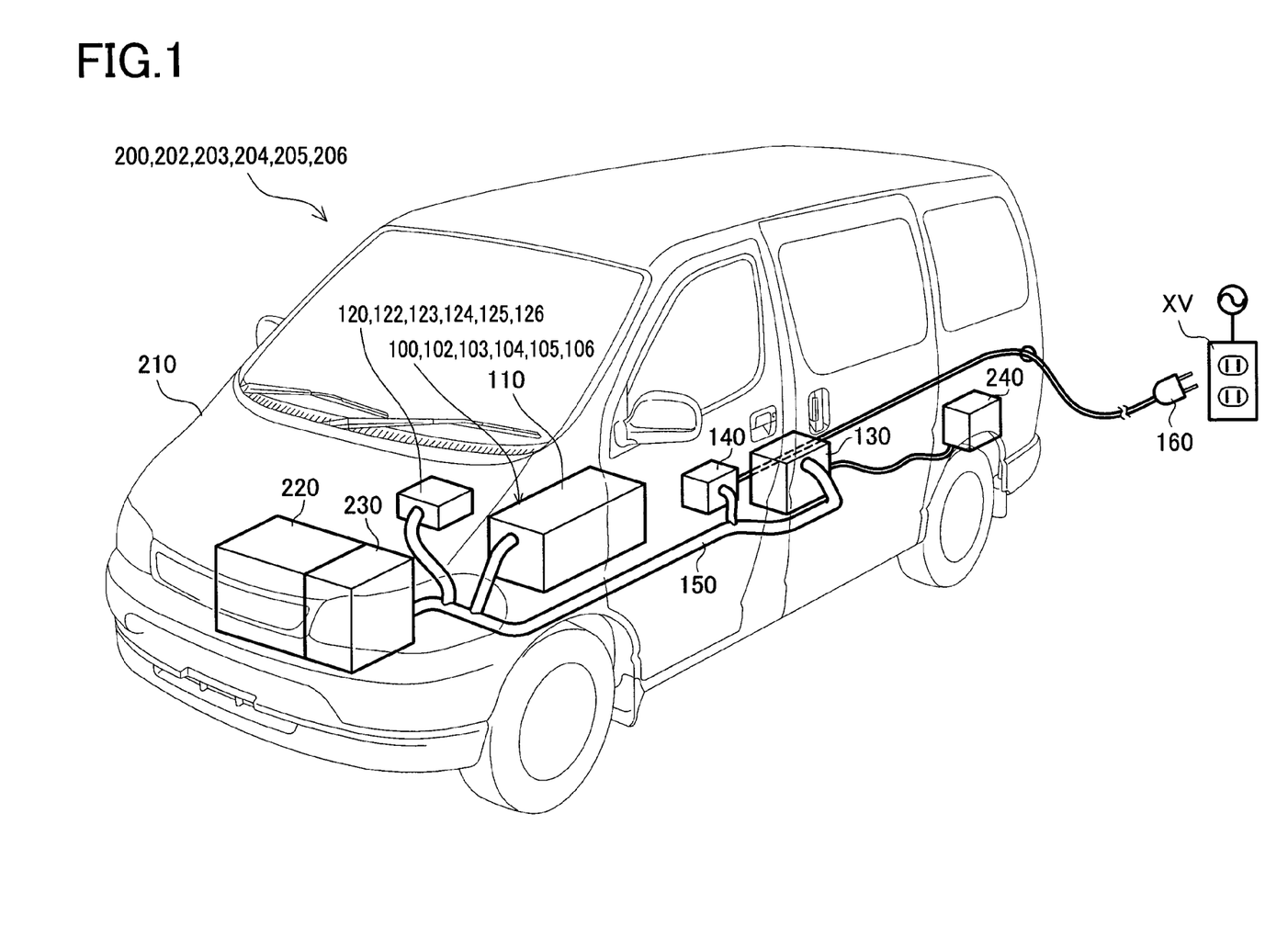
FIG. 1 is an explanatory view schematically showing a battery system-equipped vehicle mounting a battery system in Embodiment 1.

A detailed description of a preferred embodiment of the present invention will now be given referring to the accompanying drawings. FIG. 1 shows a plug-in hybrid car (a battery system-equipped vehicle) 200 equipped with a battery system 100 in Embodiment 1. This plug-in hybrid car 200 includes an engine 220, a front motor 230, a rear motor 240, and a battery system 100 which are mounted in a vehicle body 210.

The battery system 100 includes a battery pack (a secondary battery) 110 containing a plurality of connected lithium secondary batteries, an ECU 120, an inverter 130, an AC-DC converter 140, a cable 150 connecting them, and a cable 160 with a plug to be used for connection to an external power source XV. Electric energy generated by the battery pack 110 is used for driving the front motor 230 and the rear motor 240. This plug-in hybrid car 200 is a plug-in vehicle capable of charging the battery pack 110 by connection to the external power source XV.

In these battery system 100 and plug-in hybrid car 200, the ECU 120 sets an upper limit of an electrical quantity (an upper-limit electrical quantity Da) obtainable from the battery pack 110 to a lower value than that in a full charge state and charges the battery pack 110 under the condition that this upper-limit electrical quantity Da is an upper limit.

Setting the upper-limit electrical quantity Da is performed when the battery pack 110 is to be charged. To be concrete, the plug-in hybrid car 200 is connected to the external power source XV such as a household external power source and sets this upper-limit electrical quantity Da in performing plug-in charging from the external power source XV.

When the upper-limit electrical quantity Da is to be set, an electrical quantity obtainable from the battery pack 110 in a full-charge state (a full-charge electrical quantity Dmax) at that time is determined. The upper-limit electrical quantity Da is set to a value whose difference from the full-charge electrical quantity Dmax is smaller as the deterioration of the battery pack 110 advances.

Figure 4:
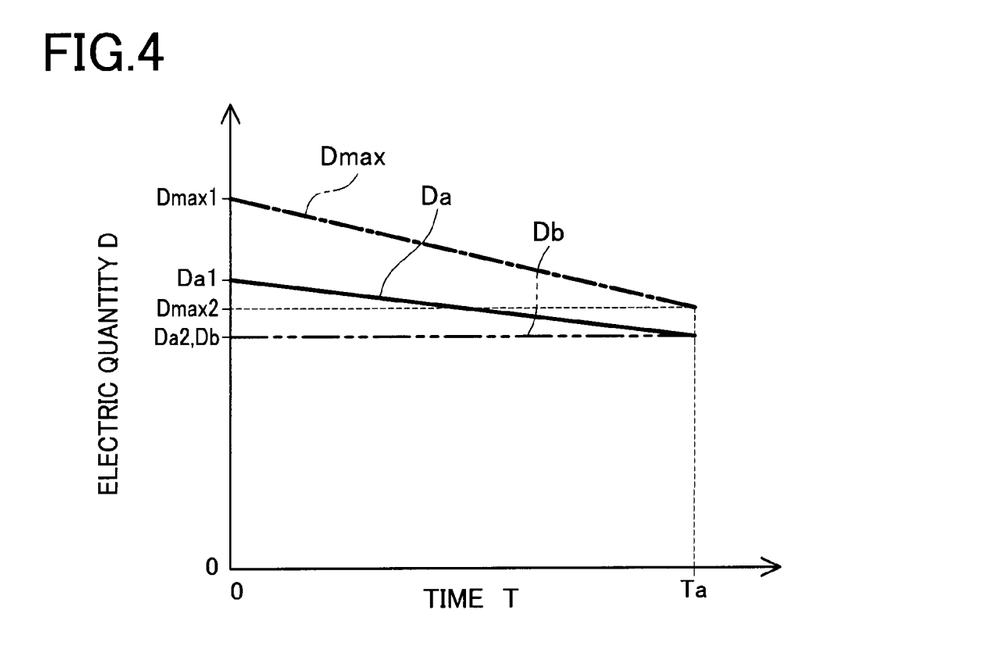
FIG. 4 is a graph showing a relationship between time T and electrical quantity D obtainable from the battery pack in Embodiment 1.

More specifically, as shown in FIG. 4, the full-charge electrical quantity Dmax (indicated by a dashed line) obtainable from the battery pack 110 in the full charge state gradually decreases from a new vehicle stage (a full-charge electrical quantity Dmax 1) to a stage after a lapse of a performance warranty period Ta (10 years in Embodiment 1) (a full-charge electrical quantity Dmax2). On the other hand, the upper-limit electrical quantity Da (indicated by a solid line) gradually decreases from the initial state of a new car (an upper-limit electrical quantity Da1) to a state after a lapse of a performance warranty period Ta (an upper-limit electrical quantity Da2) at a decreasing rate lower than a decreasing rate of the full-charge electrical quantity Dmax. Thus, as the deterioration of the battery pack 110 progresses, the upper-limit electrical quantity Da has a smaller difference from the full-charge electrical quantity Dmax.

In Embodiment 1, a relationship shown in FIG. 4 between the full-charge electrical quantity Dmax and the corresponding upper-limit electrical quantity Da is stored in the form of a table in the ECU 120. From this data, the upper-limit electrical quantity Da is set corresponding to the full-charge electrical quantity Dmax. As an alternative, it may be arranged to store the relationship between the full-charge electrical quantity Dmax and the upper-limit electrical quantity Da in the form of a function in the ECU 120 and, from this data, set the upper-limit electrical quantity Da corresponding to the full-charge electrical quantity Dmax.

An example of plug-in charging of the plug-in hybrid car 200 is explained below referring to a flowchart in FIG. 2.

The plug-in hybrid car 200 is first connected to the external power source XV and the plug-in charging is started. In step S1, a present deterioration degree of the battery pack 110 is determined. In Embodiment 1, specifically, the internal resistance R of the battery pack 110 is measured. From this value of internal resistance R, an electrical quantity obtainable from the full charge state (a full-charge electrical quantity Dmax) is determined.

To be concrete, in Embodiment 1, the relationship between the internal resistance R of the battery pack 110 and the full-charge electrical quantity Dmax is previously stored in the form of a table in the ECU 120. From this data, a present full-charge electrical quantity Dmax corresponding to the present internal resistance R is determined.

As an alternative, it may be arranged to previously store the relationship between the internal resistance R and the full-charge electrical quantity Dmax in the form of a function in the ECU 120 and, from this data, determine the full-charge electrical quantity Dmax corresponding to the internal resistance R.

A method of measuring the deterioration degree of the battery pack 110 is not limited to the above. For instance, the full-charge electrical quantity Dmax may also be determined by performing full charging and complete discharging and then actually measuring a battery capacity of the battery pack 110 prior to plug-in charging. For measuring the deterioration degree of the battery pack 110, the followings can be appropriately utilized: travel or running distance and running time, vehicle parking time, electric charge quantity to be supplied to the battery pack 110, temperature history of the battery pack 110, electric-current rate history of the battery pack 110, SOC history of the battery pack 110, resistance increasing rate, charging capacity, and discharging capacity of the battery pack 110, etc.

After measurement of the deterioration degree of the battery pack 110, the program advances to step S2 where the ECU 120 sets the upper-limit electrical quantity Da. As described above, the ECU 120 previously stores the relationship between the full-charge electrical quantity Dmax and the corresponding upper-limit electrical quantity Da in the form of a table. From this data, the upper-limit electrical quantity Da is directly set corresponding to the full-charge electrical quantity Dmax obtained in step S1.

The ECU 120 executing the steps S1 and S2 corresponds to the aforementioned upper-limit electrical quantity setting means.

In step S3, thereafter, charging of the battery pack 110 is started. In step S4, it is determined whether or not the upper-limit electrical quantity Da is reached. In other word, an electrical quantity D currently obtainable from the battery pack 110 is determined and it is judged whether or not this electrical quantity D reaches the upper-limit electrical quantity Da. Herein, if NO, i.e., if the electrical quantity D of the battery pack 110 does not reach the upper-limit electrical quantity Da yet, charging of the battery pack 110 is continued. On the other hand, if YES, i.e., if the electrical quantity D of the battery pack 110 reaches the upper-limit electrical quantity Da, the plug-in charging is terminated.

The ECU 120 executing the steps S3 and S4 corresponds to the aforementioned charging means.

In Embodiment 1, the upper-limit electrical quantity Da is set when the plug-in charging is to be performed. Alternatively, concurrently with or separately from the above setting, the upper-limit electrical quantity Da is set at regular intervals (e.g., every one month) and updated.

Figure 2:
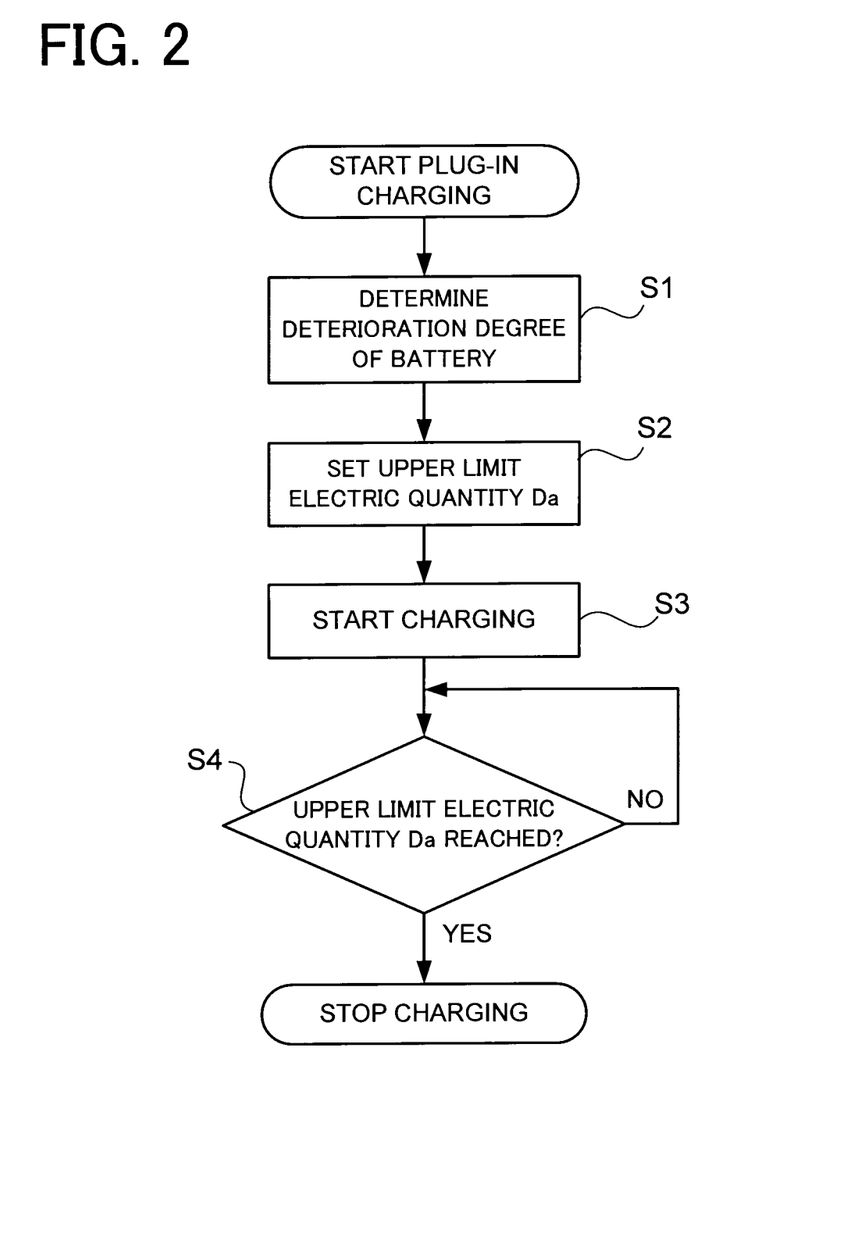
FIG. 2 is a flowchart showing plug-in charging in Embodiment 1.

FIG. 2 shows the example of performing the plug-in charging. Even in the case of performing charging through a regenerative braking during traveling or others, charging is terminated when the electrical quantity of the battery pack 110 reaches the upper-limit electrical quantity Da. The charging through this regenerative braking or others can use a latest upper-limit electrical quantity Da set earlier than this charging (an upper-limit electrical quantity set and updated regularly, for example, every one month).

As explained above, in the battery system 100 in Embodiment 1, the ECU 120 sets the upper-limit electrical quantity Da obtainable from the battery pack 110 to a smaller value than in the full-charge state (steps S1 and S2), and charges the battery pack 110 up to the upper-limit electrical quantity Da (steps S3 and S4). By setting the upper limit of the electrical quantity D obtainable from the battery pack 110, it is possible to inhibit the progress of deterioration of the battery pack 110. Accordingly, the capacity of the battery pack 110 required in light of future deterioration can be made smaller and the initial capacity of the battery pack 110 mounted in the battery system 100 can also be reduced.

Figure 3:
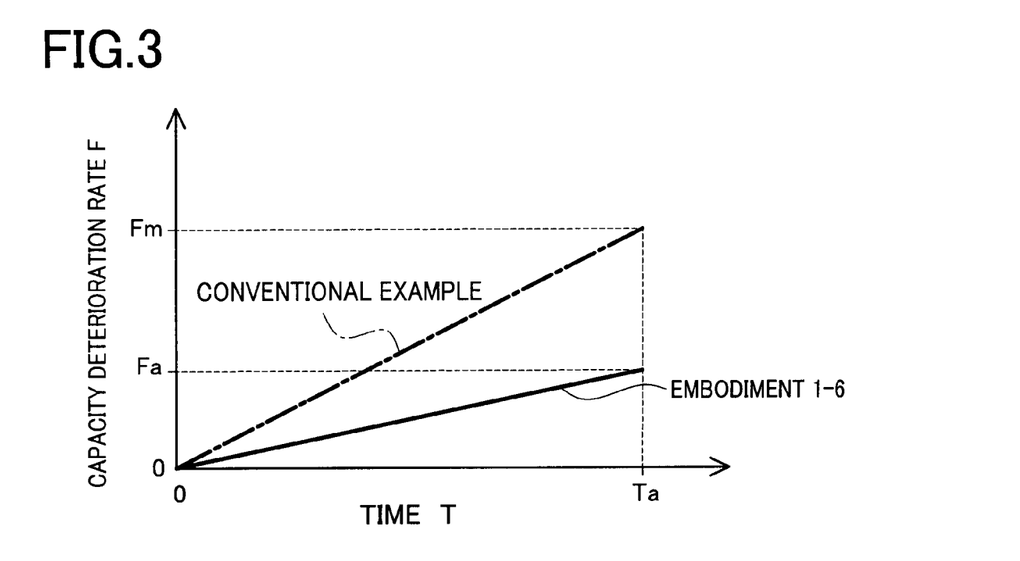
FIG. 3 is a graph showing a relationship between time T and capacity degradation ratio F of a battery pack in Embodiment 1.

As shown in FIG. 3, specifically, the battery pack 110 in the conventional battery system has a high capacity degradation ratio Fm after a lapse of the performance warranty period Ta (e.g., 10 years). On the other hand, the battery pack 110 in the battery system 100 of Embodiment 1 has a sufficiently low capacity degradation ratio Fa after a lapse of the performance warranty period Ta. The capacity degradation ratio F (%) indicates a ratio of a decreased amount of battery capacity decreased due to deterioration with respect to a battery capacity of the battery pack 110 in a brand-new state.

In the battery system 100 of Embodiment 1, as described above, as the deterioration of the battery pack 110 progresses, the upper-limit electrical quantity Da is set to a value whose difference from the electrical quantity obtainable at that time from the full charge state (the full-charge electrical quantity Dmax) is gradually smaller (see FIG. 4). Therefore, even when the deterioration of the battery pack 110 progresses, the electrical quantity D obtainable from the battery pack 110 when charged up to the upper-limit electrical quantity Da more slowly decreases as compared with the deterioration of the battery pack 110, and the electrical quantity D will not decrease to the progression that the deterioration of the battery pack 110 progresses.

Accordingly, the battery system 100 can ensure the electrical quantity D sufficiently allowed to be charged and discharged stably for a long period. To be specific, it is possible to obtain a warranted electrical quantity D or more from the battery pack 110 for the performance warranty period (e.g., 10 years). Therefore the plug-in hybrid car 200 mounting this battery system 100 can ensure a sufficient travelable distance after charging for a long period. In other words, the plug-in hybrid car 200 can ensure a predetermined travelable distance (e.g., 30 km) for the performance warranty period (e.g., 10 years).

Figure 5:
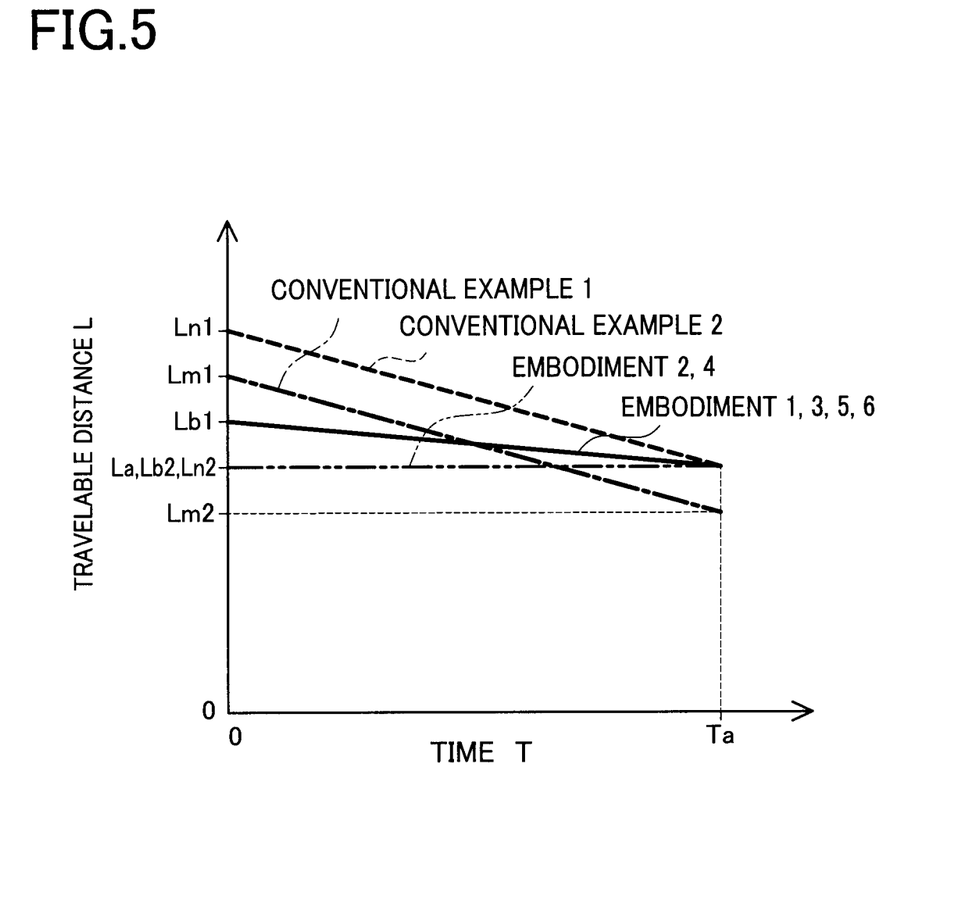
FIG. 5 is a graph showing a relationship between time T and travelable distance L in Embodiment 1.

As shown in FIG. 5, specifically, in the conventional battery system-equipped vehicle, full charging is repeated and hence the deterioration of the battery pack 110 progresses more quickly. For example, in some cases as shown by a dashed line (Conventional example 1), a travelable distance Lm2 after a lapse of the performance warranty period Ta (e.g., 10 years) becomes greatly lower than a travelable distance Lm1 in a new vehicle stage and below a warranted travelable distance La (e.g., 30 km). Thus, an initial battery capacity to be mounted has to be remarkably high in order to ensure the warranted travelable distance La even after the performance warranty period Ta. For instance, as shown by a broken line (Conventional example 2) in FIG. 5, a travelable distance Ln1 in a new vehicle stage has to be remarkably larger than the warranted travelable distance La in order to ensure the warranted travelable distance La even when a travelable distance Ln2 after a lapse of the performance warranty period Ta becomes greatly lower. This results in heavy vehicle weight and cost increase.

On the other hand, in Embodiment 1, the deterioration of the battery pack 110 is sufficiently restrained as described above. Accordingly, as indicated by a solid line in FIG. 5, a travelable distance Lb2 after a lapse of the performance warranty period Ta (e.g., 10 years) is not so lower than a travelable distance Lb1 in a new vehicle stage. The warranted travelable distance La (e.g., 30 km) can be ensured even when the initial battery capacity is reduced (set equal to that in Conventional example 1).

In the plug-in hybrid car 200 in Embodiment 1, as mentioned above, when the plug-in charging is to be performed, the upper-limit electrical quantity Da is set by the ECU 120 (the steps Si and S2) according to the deterioration degree of the battery pack 110 at that time. Plug-in charging is considered to enable charging for a long period for example from night to morning in many cases.

Accordingly, charging up to the upper-limit electrical quantity Da can be achieved, differently from charging performed through the regenerative braking for a short time during traveling. In this plug-in hybrid car 200, the upper-limit electrical quantity Da is set according to the deterioration degree of the battery pack 110 at that time when the plug-in charging is performed. Thus, a more appropriate upper-limit electrical quantity Da can be set according to the deterioration degree of the battery pack 110 at that time to perform appropriate plug-in charging.

(Embodiment 2)

Embodiment 2 will be described below. In a battery system 102 of Embodiment 2 and a plug-in hybrid car 202 mounting a battery system 102, an upper-limit electrical quantity Db is different from the upper-limit electrical quantity Da in Embodiment 1. Other parts or components are identical to those in Embodiment 1 and thus are not explained again or are briefly explained.

Also in Embodiment 2, an ECU 122 directly sets the upper-limit electrical quantity Db to a value whose difference from a full-charge electrical quantity Dmax becomes smaller as the deterioration of the battery pack 110 progresses as in Embodiment 1; however, the value to be set is different from the upper-limit electrical quantity Da in Embodiment 1.

To be specific, in Embodiment 2, the upper-limit electrical quantity Db is set to a fixed value. As shown in FIG. 4, specifically, a full-charge electrical quantity Dmax (indicated by a dashed line) obtainable from the battery pack 110 in a full charge state gradually decreases from a new vehicle stage (a full-charge electrical quantity Dmax1) to a stage after a lapse of a performance warranty period Ta (e.g. 10 years) (a full-charge electrical quantity Dmax2). On the other hand, the upper-limit electrical quantity Db (indicated by a chain double dashed line) is set to a fixed value from the new vehicle stage to the stage after a lapse of the performance warranty period Ta. The upper-limit electrical quantity Db has a smaller difference from the full-charge electrical quantity Dmax as the deterioration of the battery pack 110 progresses.

Since the upper-limit electrical quantity Db is fixed as above, even when the deterioration of the battery pack 110 advances, the electrical quantity D obtainable from the battery pack 110 when charged up to the upper-limit electrical quantity Db can be made constant. Accordingly, in the battery system 102 in Embodiment 2, the magnitude of the electrical quantity D allowed to be discharged and charged can be made constant for a long period.

In the plug-in hybrid car 202 mounting that battery pack 110 can achieve a constant travelable distance after charging for a long period. To be concrete, a constant travelable distance (e.g., 30 km) can be ensured for the performance warranty period (e.g., 10 years). In other words, as shown by a chain double dashed line in FIG. 5, a constant warranted travelable distance La (e.g., 30 km) can be ensured anytime without change between the travelable distance in the new vehicle stage and the travelable distance after a lapse of the performance warranty period Ta (e.g., 10 years). Other similar parts or components as those in Embodiment 1 can provide the same operations and effects as in Embodiment 1.

(Embodiment 3)

Embodiment 3 will be explained below. A battery system 103 of Embodiment 3 and a plug-in hybrid car 203 mounting this battery system 103 are different from the battery system 100 of Embodiment 1 and the plug-in hybrid car 200 in that an upper-limit SOC is set as an index corresponding to the upper-limit electrical quantity instead of directly setting the upper-limit electrical quantity, and a battery pack 110 is charged under the condition that this upper-limit SOC is an upper limit. Other parts or components are substantially similar to those in Embodiment 1 and hence are not explained again or are briefly explained.

In Embodiment 3, an ECU 123 sets the upper-limit SOC to a smaller value than SOC 100% to indirectly set a corresponding upper-limit electrical quantity. The battery pack 110 is thus charged under the condition that the upper-limit SOC corresponding to the upper-limit electrical quantity is an upper limit.

Setting the upper-limit SOC (setting the upper-limit electrical quantity) is performed when the battery pack 110 is to be charged. To be concrete, this upper-limit SOC (the upper-limit electrical quantity) is set when the plug-in charging is performed by connection to the external power source XV.

The upper-limit SOC is set to a value which becomes larger as the deterioration of the battery pack 110 progresses (in Embodiment 3, a value that linearly gradually increases). In Embodiment 3, the ECU 123 previously stores the relationship between a capacity degradation ratio F and a corresponding upper-limit SOC in the form of a table. From this data, the upper-limit SOC is set corresponding to the capacity degradation ratio F. As an alternative, the relationship between the capacity degradation ratio F and the upper-limit SOC may be previously stored in the form of a function in the ECU 123, so that the upper-limit SOC is set corresponding to the capacity degradation ratio F based on that data.

Figure 6:
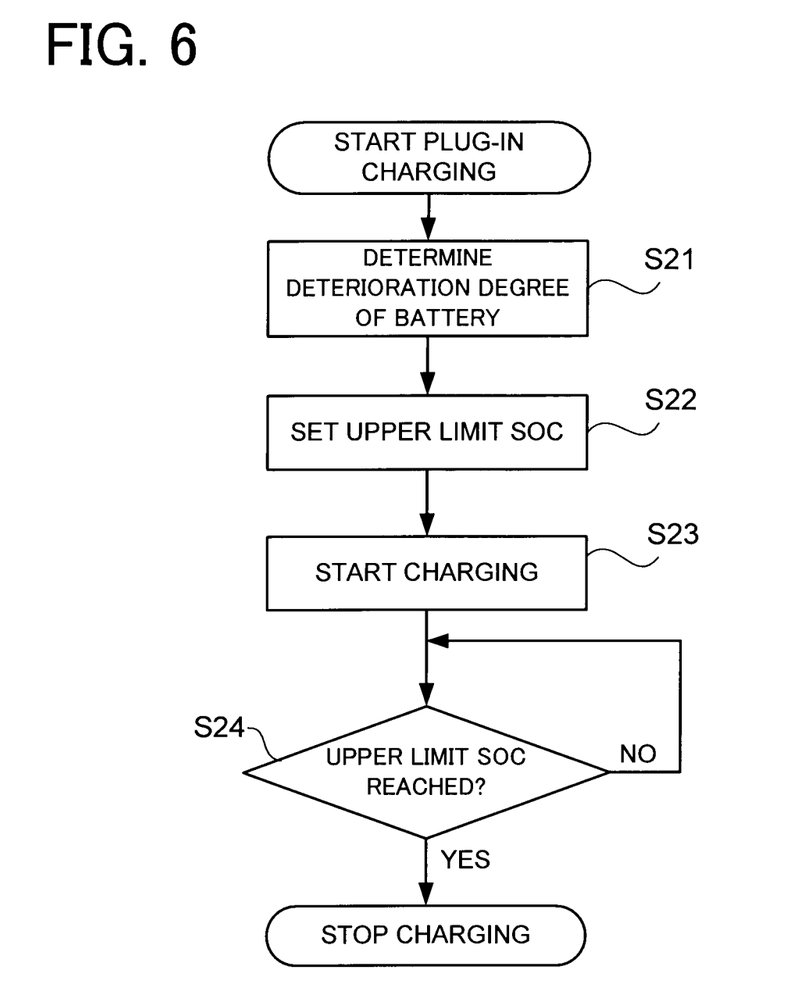
FIG. 6 is a flowchart showing plug-in charging in Embodiment 3.

An explanation is given to the case where the plug-in hybrid car 203 of Embodiment 3 is subjected to plug-in charging, referring to a flowchart in FIG. 6.

Firstly, the plug-in hybrid car 203 is connected to an external power source XV and the plug-in charging is started. In step S21, a present deterioration degree of the battery pack 110 is determined. In Embodiment 3, the internal resistance R of the battery pack 110 is measured and, based on this internal resistance R, a present capacity degradation ratio F of the battery pack 110 is determined.

In Embodiment 3, to be concrete, the relationship between the internal resistance R and the capacity degradation ratio F in the battery pack 110 are previously stored in the ECU 123 in the form of a table. From this data, a present capacity degradation ratio F is determined corresponding to a present internal resistance R.

As an alternative, it may be arranged to store the relationship between the internal resistance R and the capacity degradation ratio F in the form of a function in the ECU 123 and, based on this, the capacity degradation ratio F is determined corresponding to the internal resistance R.

In step S22, the ECU 123 sets the upper-limit SOC. The ECU 123 previously stores the relationship between the capacity degradation ratio F and the corresponding upper-limit SOC in the form of a table, as mentioned above. From this data, the upper-limit SOC is set corresponding to the capacity degradation ratio F calculated in step S21.

The ECU 123 executing the steps S21 and S22 corresponds to the aforementioned upper-limit SOC setting means and also the aforementioned upper-limit electrical quantity setting means.

In step S23, successively, charging of the battery pack 110 is started. In step S24, it is determined whether or not the upper-limit SOC is reached. In other words, a present SOC of the battery pack 110 is calculated from the battery voltage and it is determined whether or not this upper-limit SOC is reached. If NO in this step, that is, if the SOC of the battery pack 110 does not reach the upper-limit SOC yet, the charging of the battery pack 110 is continued. On the other hand, if YES, that is, if the SOC of the battery pack 110 reaches the upper-limit SOC, this plug-in charging is terminated.

The ECU 123 executing the steps S23 and S24 corresponds to the aforementioned charging means.

In Embodiment 3, the upper-limit SOC is set when the plug-in charging is to be performed. As an alternative, concurrently with or separately from the above setting, the upper-limit SOC is set at regular intervals (e.g., every one month) and updated.

In Embodiment 3, the present SOC of the battery pack 110 is calculated from the battery voltage. However, the method of calculating the SOC is not limited to the above. For instance, the SOC of the battery pack 110 may be calculated by adding an electrical quantity D charged in or discharged from the battery pack 110 based on the current allowed to flow to the battery pack 110.

FIG. 6 shows the case where plug-in charging is performed. In addition, even when charging is conducted through the regenerative braking and others during traveling, the charging is terminated when the battery pack 110 reaches the upper-limit SOC. The charging through the regenerative braking and others can use a latest upper-limit SOC set earlier than this charging operation (for example, an upper-limit SOC set and updated at regular intervals, e.g., every one month)

As explained above, in the battery system 103 of Embodiment 3, the ECU 123 sets an upper-limit SOC smaller than SOC 100% (the steps S21 and S22) and charges the battery pack 110 up to this SOC (the steps S23 and S24). By setting the upper limit of the electrical quantity D obtainable from the battery pack 110, it is possible to inhibit the progress of deterioration of the battery pack 110 (see FIG. 3). Accordingly, the capacity of the battery pack 110 required in light of future deterioration can be made lower and the initial capacity of the battery pack 110 mounted in the battery system 103 can also be made lower.

In the battery system 103 in Embodiment 3, furthermore, as described above, the upper-limit SOC is set to a larger value as the deterioration of the battery pack 110 progresses. Therefore, even when the deterioration of the battery pack 110 progresses, the electrical quantity D obtainable from the battery pack 110 when charged up to the upper-limit SOC slowly decreases as compared with the deterioration of the battery pack, and the electrical quantity D will not decrease to such an extend that the deterioration of the battery pack 110 progresses. Accordingly, the battery system 103 can ensure the electrical quantity D sufficiently allowed to be charged and discharged stably for a long period. To be specific, it is possible to obtain a warranted electrical quantity D or more from the battery pack 110 for the performance warranty period (e.g., 10 years). Therefore the plug-in hybrid car 203 mounting this battery system 103 can achieve a sufficient travelable distance after charging for a long period. In other words, the plug-in hybrid car 203 can ensure a predetermined travelable distance (e.g., 30 km) for the performance warranty period (e.g., 10 years) (see FIG. 5).

In the plug-in hybrid car 203 in Embodiment 3, when the plug-in charging is to be performed, as mentioned above, the upper-limit SOC is set by the ECU 123 (the steps S21 and S22) according to the deterioration degree of the battery pack 110 at that time. The plug-in charging is considered to enable charging up to the upper-limit SOC in many cases. Accordingly, when the plug-in charging is to be performed, the upper-limit SOC is set according to the deterioration degree of the battery pack 110 at that time. Therefore, a more appropriate upper-limit SOC can be set according to the deterioration degree of the battery pack 110 at that time, thereby performing appropriate plug-in charging. Other similar parts or components as those in Embodiment 1 or Embodiment 2 can provide the same operations and effects as in the first or Embodiment 2.

(Embodiment 4)

Embodiment 4 will be described below. A battery system 104 of Embodiment 4 and a plug-in hybrid car 204 mounting this battery system 104 are different in an upper-limit SOC to be set from that in Embodiment 3. Others are substantially similar or identical to those in Embodiment 3 and others and hence will be not explained again or be briefly explained.

Also in Embodiment 4, an ECU 124 sets an upper-limit SOC to a value that is larger as the deterioration of the battery pack 110 progresses in the same manner as in Embodiment 3 to indirectly set an upper-limit electrical quantity. However, the set value is different from the upper-limit SOC (i.e., a corresponding upper-limit electrical quantity) in Embodiment 3. In Embodiment 4, concretely, when the battery pack 110 is discharged from the upper-limit SOC, the upper-limit SOC is set to a value that provides a constant electrical quantity D obtainable from the battery pack 110 irrespective of the progress of deterioration of the battery pack 110.

Since the upper-limit SOC is set as above, even when the deterioration of the battery pack 110 progresses, the electrical quantity D obtainable from this battery pack 110 when charged up to the upper-limit SOC can be made constant. In the battery system 104 of Embodiment 4, therefore, the magnitude of the electrical quantity D allowed to be discharged and charged can be made constant for a long period.

Accordingly, the plug-in hybrid car 204 mounting this battery system 104 can make the travelable distance constant after charging for a long period. In other words, a constant warranted travelable distance (e.g., 30 km) can be ensured anytime for the performance warranty period (e.g., 10 years) (see FIG. 5). Other similar parts or components as those in one of Embodiments 1 to 3 can provide the same operations and effects as in Embodiments 1 to 3.

(Embodiment 5)

Embodiment 5 will be explained below. A battery system 105 of Embodiment 5 and a plug-in hybrid car 205 mounting this battery system 105 are different from the battery system 100 and 102 and the plug-in hybrid car 200 and 202 in Embodiments 1 and 2 in that charging of a battery pack 110 can also be made with an upper-limit electrical quantity Da being disabled. Other parts or components are substantially similar to those in Embodiment 1 and others and hence are not explained again or are briefly explained.

Also in Embodiment 5, an ECU 125 directly sets an upper-limit electrical quantity Da obtainable from the battery pack 110 as in Embodiment 1 and charges the battery pack 110 under the condition that this upper-limit electrical quantity Da is an upper limit. However, if a predetermined condition is satisfied, e.g., if additional increases in electric power consumption are estimated because of use of auxiliary devices such as a heater and an air conditioner, the upper-limit electrical quantity Da is not used as an upper limit and the battery pack 110 can be charged beyond the upper-limit electrical quantity Da.

Figure 7:
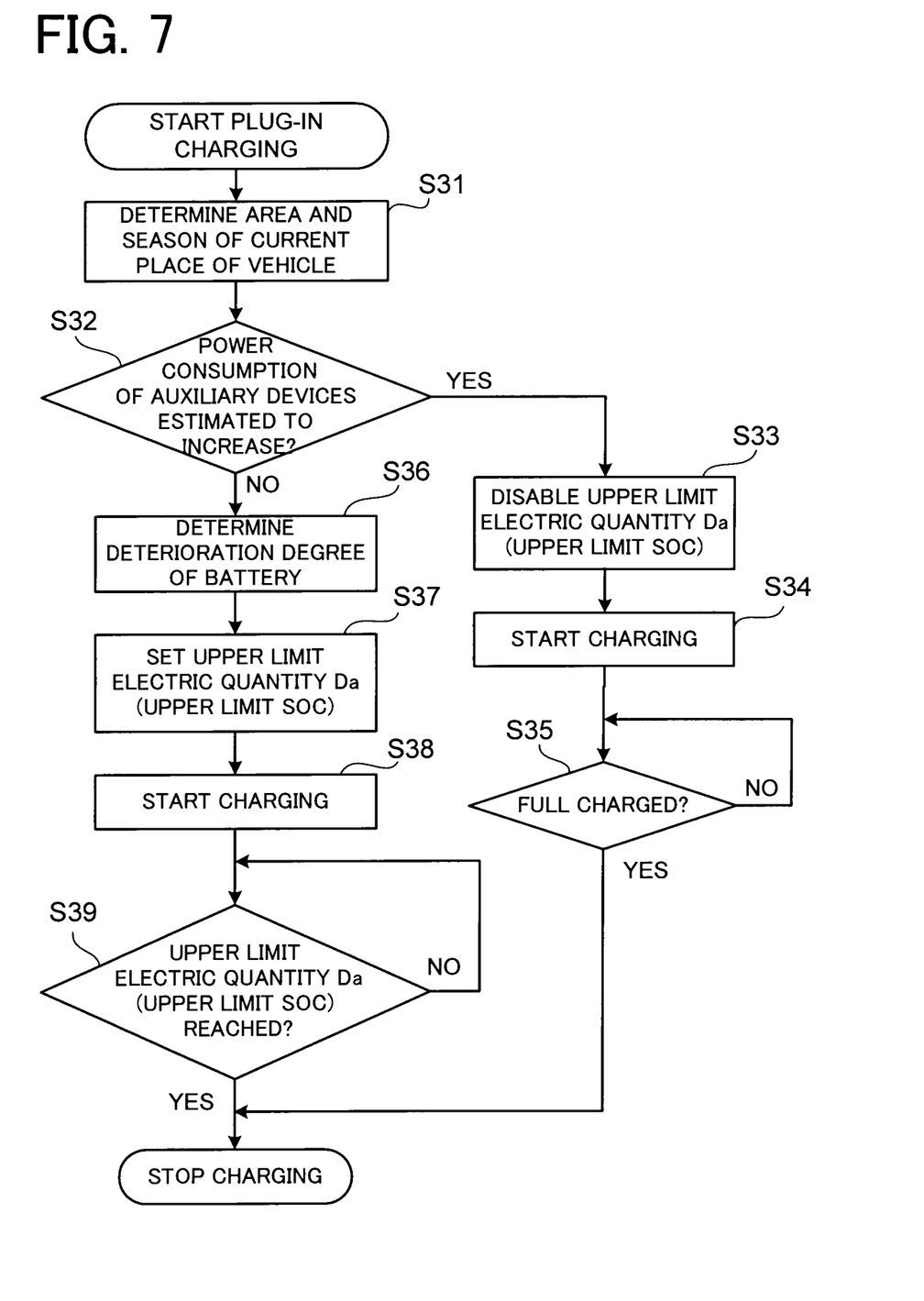
FIG. 7 is a flowchart showing plug-in charging in Embodiment 5.

An explanation will be given to the case of performing plug-in charging of the plug-in hybrid car 205 in Embodiment 5, referring to a flowchart in FIG. 7.

Firstly, the plug-in hybrid car 205 is connected to an external power source XV and then the plug-in charging is started. In step S31, the region and the season of a present location of the vehicle are determined. Determining the region and the season is made by use of for example positional information through a navigation system and internet-based information such as date, season, and weather.

In step S32, successively, it is determined whether or not the electric power consumption of the auxiliary devices is likely to increase. To be concrete, based on the information of the area and the season of the present place of the vehicle obtained in step S31, it is determined whether or not additional electric power consumption by the auxiliary devices such as a heater and an air conditioner is estimated to increase. This determination may also be made by use of past records of usage of the auxiliary devices at the time of past traveling.

If YES in this step, i.e., if the electric power consumption of the auxiliary devices is estimated to increase in advance, the program goes to step S33. In step S33, the upper-limit electrical quantity Da set earlier than this plug-in charging is disabled.

In step S34, subsequently, the charging of the battery pack 110 is started. In step S35, it is then determined whether or not the battery pack 110 reaches a full charge state. If NO in this step, i.e., if the battery pack 110 does not reach the full charge state yet, the charging of the battery pack 110 is continued. On the other hand, if YES, i.e., if the battery pack 110 reaches the full charge state, this plug-in charging is terminated.

The ECU 125 executing the steps S33 to S35 corresponds to the aforementioned upper-limit electrical quantity disabling means.

On the other hand, if NO in step S32, i.e., if the electric power consumption of the auxiliary devices is estimated not to increase, the program goes to step S36 where a present deterioration degree of the battery pack 110 is determined. Step S36 and subsequent steps are the same as in Embodiment 1. In other words, a full-charge electrical quantity Dmax is calculated in step S36 and an upper-limit electrical quantity Da is set in step S37. In step S38, successively, charging of the battery pack 110 is started. In step S39, it is then determined whether or not a present electrical quantity D of the battery pack 110 reaches the upper-limit electrical quantity Da. If it reaches the upper-limit electrical quantity Da, this plug-in charging is terminated.

In Embodiment 5, the ECU 125 executing the steps S36 and S37 corresponds to the aforementioned upper-limit electrical quantity setting means, and the ECU 125 executing the steps S38 and S39 corresponds to the aforementioned charging means.

In Embodiment 5, as mentioned above, when it is previously estimated that the electric power consumption of the auxiliary devices increases (step S32), the upper-limit electrical quantity Da is disabled (step S33) and charging is conducted up to the full charge state (steps S34 and S35). As an alternative, after the upper-limit electrical quantity Da is disabled, a second upper-limit electrical quantity larger than the disabled upper-limit electrical quantity Da but smaller than that in the full charge state may be newly set, so that the charging of the battery pack 110 is conducted up to this second upper-limit electrical quantity.

As explained above, the battery system 105 of Embodiment 5 and the plug-in hybrid car 205 can charge the battery pack 110 beyond the upper-limit electrical quantity Da without using the upper-limit electrical quantity Da as an upper limit. Accordingly, in the case where the electric power consumption is estimated in advance to increase because of use of a heater and an air conditioner, the travelable distance can be sufficiently ensured.

In the case where a secondary battery in which a memory effect occurs, such as a nickel metal hydride battery, is used in the battery pack 110, as a result of repeated charging and discharging of the battery pack 110, the memory effect may cause a decrease in electrical quantity D allowed to be charged and discharged. In the battery system 105 of Embodiment 5, on the other hand, the battery pack 110 can be charged beyond the upper-limit electrical quantity Da. When the battery pack 110 is discharged once to SOC 0% and then charged up to SOC 100%, the battery pack 100 can be refreshed.

Accordingly, even when the memory effect occurs in the battery pack 110, this memory effect can be disabled. Other similar parts or components as those in one of Embodiments 1 to 4 can provide the same operations and effects as in one of Embodiments 1 to 4.

(Embodiment 6)

Embodiment 6 will be explained below. A battery system 106 of Embodiment 6 and a plug-in hybrid car 206 mounting this battery system 105 are different from the battery system 103 and 104 and the plug-in hybrid car 203 and 204 in Embodiments 1 to 4 in that an upper-limit electrical quantity Da is disabled for charging a battery pack 110. Other parts or components are substantially similar to those in Embodiment 3 and others and hence are not explained again or are briefly explained.

In Embodiment 6, an upper-limit SOC is used as an index corresponding to the upper-limit electrical quantity Da instead of directly setting the upper-limit electrical quantity Da in Embodiment 5. Specifically, in step S33 in FIG. 7, the set upper-limit SOC is disabled instead of disabling the set upper-limit electrical quantity Da. In steps S36 of S39 in FIG. 7, furthermore, an upper-limit SOC is set as an index corresponding to the upper-limit electrical quantity Da instead of directly setting the upper-limit electrical quantity Da, and conducting charging of the battery pack 110 under the condition that the upper-limit SOC is an upper limit. In other words, the steps S21 to S24 (see FIG. 6) described in Embodiment 3 are conducted.

In Embodiment 6, the ECU 126 executing the steps S33 to S35 corresponds to the aforementioned upper-limit SOC disabling means and also the upper-limit electrical quantity disabling means. The ECU 126 executing the steps S36 and S37 corresponds to the aforementioned upper-limit SOC setting means and the upper-limit electrical quantity setting means. The ECU 126 executing the steps S38 and S39 corresponds to the aforementioned charging means.

As explained above, the battery system 106 of Embodiment 6 and the plug-in hybrid car 206 can charge the battery pack 110 beyond the battery system without using the upper-limit SOC as an upper limit. Accordingly, even when it is estimated in advance that the electric power consumption increases due to usage of a heater and an air conditioner, the travelable distance can be sufficiently ensured.

In the case where the secondary battery in which a memory effect occurs is used in the battery pack 110, as a result of repeated charging and discharging, the memory effect may cause a decrease in electrical quantity D allowed to be charged and discharged to the battery pack 110. In the battery system 106 of Embodiment 6, on the other hand, the battery pack 110 can be charged beyond the upper-limit SOC. For instance, when the battery pack 110 is discharged once to SOC 0% and charged up to 100%, the battery pack 110 can be refreshed. Accordingly, even when the memory effect occurs in the battery pack 110, this memory effect can be disabled. Other similar parts or components as those in one of Embodiments 1 to 5 can provide the same operations and effects as in one of Embodiments 1 to 5.

The present invention is explained in the above Embodiments 1 to 6 but is not limited thereto. The present invention may be embodied in other specific forms without departing from the essential characteristics thereof.

For instance, Embodiments 1 to 6 exemplify the secondary battery in the form of the battery pack including the lithium secondary batteries. As an alternative, the present invention is also applicable to other kinds of secondary batteries such as a nickel metal hydride battery and a nickel cadmium battery.

In Embodiments 1 to 6, furthermore, the deterioration degree of the battery pack 110 is determined at the time when the plug-in charging is to be performed, and the upper-limit electrical quantity Da or the upper-limit SOC are set so that the battery pack 110 is charged up to the setting. As an alternative, the plug-in charging may be conducted by use of a latest upper-limit electrical quantity Da or a latest upper-limit SOC set earlier than the plug-in charging (e.g., an upper-limit electrical quantity Da or an upper-limit SOC, which is set and updated regularly every one month).

The invention claimed is:

1. A battery system including a secondary battery and using electric energy of this secondary battery for a power source, the battery system comprising:
    an upper-limit electrical quantity setting means for setting an upper-limit electrical quantity which is an upper limit of an electrical quantity obtainable from the secondary battery to a lower quantity than a full-charge electrical quantity which is an electrical quantity obtainable from the secondary battery in a full charge state, the upper-limit electrical quantity setting means being arranged to set the upper-limit electrical quantity to a value having a difference from the full-charge electrical quantity so that the difference is smaller as deterioration of the secondary battery progresses, and so that the upper-limit electrical quantity is gradually decreased as compared with a decrease in the full-charge electrical quantity caused by the deterioration of the secondary battery; and
    a charging means for charging the secondary battery under the condition that the upper-limit electrical quantity is an upper limit when the secondary battery is charged.

2. The battery system according to claim 1 further comprising an upper-limit electrical quantity disabling means for enabling charging of the secondary battery beyond the upper-limit electrical quantity by disabling the upper-limit electrical quantity as the upper limit.

3. The battery system according to claim 2, wherein the secondary battery has a characteristic of causing a memory effect.

4. A battery system-equipped vehicle mounting the battery system according to claim 1.

5. The battery system-equipped vehicle according to claim 4, wherein
    the battery system-equipped vehicle is a plug-in vehicle capable of charging the secondary battery when the vehicle is connected to an external power source, and
    the upper-limit electrical quantity setting means sets the upper-limit electrical quantity according to a deterioration degree of the secondary battery at that time when plug-in charging through the external power source is to be performed.

6. A battery system including a secondary battery and using electric energy of this secondary battery for a power source, the battery system comprising:
    an upper-limit SOC setting means for setting an upper-limit SOC smaller than SOC 100%, this setting means being arranged to set the upper-limit SOC to a larger value as the deterioration of the secondary battery progresses and to gradually decrease the electrical quantity obtainable from the secondary battery with the upper-limit SOC as compared with a decrease in a full-charge electrical quantity caused by the deterioration of the secondary battery, the full-charge electrical quantity being an electrical quantity obtainable from the secondary battery in a full charge state; and a charging means for charging the secondary battery under the condition that the upper-limit SOC is an upper limit when the secondary battery is charged.

7. The battery system according to claim 6 further comprising an upper-limit SOC disabling means for enabling charging of the secondary battery beyond the upper-limit SOC by disabling the upper-limit SOC as the upper limit.

8. The battery system according to claim 7, wherein the secondary battery has a characteristic of causing a memory effect.

9. A battery system-equipped vehicle mounting the battery system according to claim 6.

10. The battery system-equipped vehicle according to claim 9, wherein
the battery system-equipped vehicle is a plug-in vehicle capable of charging the secondary battery when the vehicle is connected to an external power source, and
the upper-limit SOC setting means sets the upper-limit SOC according to a deterioration degree of the secondary battery at that time when plug-in charging through the external power source is to be performed.

* * * * *